(12) United States Patent
Covey

(10) Patent No.: US 8,375,414 B2
(45) Date of Patent: Feb. 12, 2013

(54) METHOD, APPARATUS, AND COMPUTER PROGRAM PRODUCT FOR DYNAMIC BANDWIDTH MANAGEMENT IN AN IP-NETWORK

(75) Inventor: Daniel Covey, North Bend, WA (US)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 471 days.

(21) Appl. No.: 12/525,872

(22) PCT Filed: Dec. 10, 2007

(86) PCT No.: PCT/EP2007/063627
§ 371 (c)(1),
(2), (4) Date: Aug. 25, 2009

(87) PCT Pub. No.: WO2008/095566
PCT Pub. Date: Aug. 14, 2008

(65) Prior Publication Data
US 2010/0005499 A1    Jan. 7, 2010

Related U.S. Application Data

(60) Provisional application No. 60/900,625, filed on Feb. 9, 2007.

(51) Int. Cl.
*H04N 7/16*    (2006.01)
*H04N 7/173*   (2011.01)

(52) U.S. Cl. ................ 725/95; 725/25; 725/86; 725/90; 725/105

(58) Field of Classification Search ...................... 725/95
See application file for complete search history.

(56) References Cited

U.S. PATENT DOCUMENTS

| | | | |
|---|---|---|---|
| 5,917,822 A * | 6/1999 | Lyles et al. | 370/395.4 |
| 2002/0155852 A1 * | 10/2002 | Bender | 455/522 |
| 2006/0171390 A1 * | 8/2006 | La Joie | 370/390 |
| 2006/0184992 A1 | 8/2006 | Kortum | |
| 2007/0204313 A1 * | 8/2007 | McEnroe et al. | 725/95 |
| 2007/0256111 A1 * | 11/2007 | Medford et al. | 725/118 |
| 2008/0154958 A1 * | 6/2008 | Sloo et al. | 707/104.1 |

OTHER PUBLICATIONS

Anonymous, "Method for IPTV fast channel change using only multicast streams", Oct. 11, 2006, 7 page(s), IP.com.
Larribeau, "Optimizing Networks for IPTV", Nov. 29, 2005, 3 page(s), Telecommunications Online.

* cited by examiner

*Primary Examiner* — Justin Shepard
(74) *Attorney, Agent, or Firm* — Michael Haynes PLC; Michael N. Haynes

(57) ABSTRACT

The present invention refers to a method, an apparatus and a computer program product for dynamic bandwidth management in an IP-network, wherein a channel identifier indicating a channel for a program content is detected (S0), a state identifier indicating a high bandwidth permission for a terminal equipment is checked (S1), a high bandwidth IP address for said detected channel identifier is determined (S2), and in case a high bandwidth permission exists a joining (S3) is realized to said high bandwidth IP address to receive a high bandwidth content of said channel, or a high bandwidth permission is requested (S10) in case no high bandwidth permission exists.

30 Claims, 3 Drawing Sheets

IP-DB

| CI<br>(Channel No.) | SI<br>(State Identifier) | IP-address<br>(physical IP-address pf Content Provider) |
|---|---|---|
| 3 | 1 | HD address of Channel No. 3 |
|   | 0 | SD address of Channel No. 3 |
| 4 | 1 | HD address of Channel No. 4 |
|   | 0 | SD address of Channel No. 4 |
| 5 | 1 | HD address of Channel No. 5 |
|   | 0 | SD address of Channel No. 5 |
| ⋮ | ⋮ | ⋮ |

METHOD, APPARATUS, AND COMPUTER PROGRAM PRODUCT FOR DYNAMIC BANDWIDTH MANAGEMENT IN AN IP-NETWORK

CROSS-REFERENCES TO RELATED APPLICATIONS

This application is a U.S. National Stage Entry of International Patent Application Serial No. PCT/EP2007/063627, filed 10 Dec. 2007, which claims priority to, and incorporates by reference herein in its entirety, U.S. Provisional Application Ser. No. 60/900,625, filed 9 Feb. 2007.

The present invention relates generally to a method, an apparatus and a computer program product for dynamic bandwidth management in an IP-network and, more particularly, to a method, an apparatus and a computer program product for simulcast dynamic in-home bandwidth management for IPTV or VoD (Video on Demand) applications in an home entertainment environment.

Current broadband multimedia distribution systems usually distribute a standard definition (SD) content having a low bandwidth on one channel number and a high definition (HD) content, having a high bandwidth on another channel number.

In a home entertainment environment conventional terminal equipment like set top boxes (STB) do not monitor a state of the access network over which they access multimedia content, such as video data, audio data etc. In the event a UDP packet (user datagram protocol) carrying required data, e.g. multicast video streams, does not arrive, a terminal equipment, such as a set top box (STB) has only limited options. In detail, the set top box can either accept the data loss which creates video artifacts, i.e. poor or lost pictures, or an operator may choose to implement pro-active ways to replace lost data such as forward error correction (FEC) which adds cost to the implementation, network overhead and latency in live content.

One preventable cause of packet loss is for an operator to ensure that the physical bandwidth available to subscriber premise equipment exceeds the sum of bandwidths necessary to simultaneously access the highest bandwidth network resources contractually available to the subscriber.

Customer research has shown that households most likely to take advantage of high bandwidth services such as HD IPTV (high definition internet protocol television) and "High Speed Broadband Internet" are also likely to have three or more TVs in their household, i.e. in the same subscriber account. Since each TV on an IPTV system requires a physical decoder to log onto a video transport stream, these households, which represent the highest revenue opportunities for operators, would require bandwidth in excess of what is currently physically possible over commercially available network hardware, e.g. ADSL 2+ and VDSL network hardware, to ensure those high bandwidth services being available 100% of the time.

Currently, the only option operators have in a multi-STB environment or household, where the subscriber receives an HD package (high definition) is to limit the HD streams to a single terminal equipment, e.g. one set top box. Where the set top box has a digital video recorder (DVR) the operator has to determine if the home can support viewing an HD stream while simultaneously recording a second HD stream on the digital video recorder if the bandwidth exists to support two HD streams at once, but is only fully used when an HD recording is taking place at the same time a different HD program is being watched on the same set top box, that bandwidth becomes excess capacity. Since providing the physical infrastructure to support two concurrent HD stream model is capital intensive, operators want a way to better re-capture their investment by making that bandwidth available to other terminal equipment within the same customer premise equipment (CPE) or the same household, when it is not in use by the primary set top box and/or digital video recorder.

An operator that allows other terminal equipment within the same household to access high bandwidth streams can, therefore, not guarantee that a subscriber household will not inadvertently attempt to access content requiring more bandwidth than the operator can physically support.

This can result in unacceptable quality of video, data and voice services at the customer premise equipment.

Current ways to address this problem include either limiting the number of terminal equipment (e.g. set top boxes) on a subscriber account that can access HD content or applying forward error correction. However, forward error correction is costly and adds network overhead. In detail, it requires about 10% more bandwidth which compounds the basic problem of not enough physical bandwidth. On the other hand limiting the number of terminal equipment or set top boxes being allowed to access HD content means that when the set top box is viewing low bandwidth content, there is excess physical capacity in the network that operators would like to use in order to realize maximum return on their capital investment.

It is, therefore, a need in the art to provide a method, an apparatus and a computer program product for dynamic band-width management in an IP-network which enables an efficient bandwidth usage and improves a user acceptance.

According to an embodiment of the present invention there is provided a method for dynamic bandwidth management in an IP network comprising the steps of: detecting a channel identifier indicating a channel for a program content; checking a state identifier indicating a high bandwidth permission for a terminal equipment; and in case a high bandwidth permission exists, determining, if possible, a high bandwidth IP-address for said detected channel identifier and joining said high bandwidth IP-address to receive a high bandwidth content of said channel; or in case no high bandwidth permission exists, requesting for a high bandwidth permission.

According to a further embodiment of the present invention there is provided an apparatus for dynamic bandwidth management in an IP-network comprising: a channel change controller for detecting a channel identifier indicating a channel for a program content; a state manager for checking a state identifier indicating a high bandwidth permission for a terminal equipment; a permission requester for requesting a high bandwidth permission for said terminal equipment; an IP-database for mapping available high as well as standard bandwidth IP addresses with a respective channel identifier; and a network layer joining protocol for joining an IP address, wherein in case said state identifier indicates a high bandwidth permission, said channel change controller determines, if possible, a high bandwidth IP address for said detected channel identifier and said network layer joining protocol joins to said determined IP address or in case said state identifier indicates no high bandwidth permission, said permission requester requests for a high bandwidth permission.

Moreover, according to the present invention there is provided a computer program product for performing the above-mentioned method steps.

Thus, according to the present invention the bandwidth available to the customer premise equipment may be efficiently used while it further creates a seamless end user experience and high quality of service (QoS).

According to a preferred embodiment of the present invention a permission request is started a predetermined time after joining a standard bandwidth IP address. In particular, in simulcast channel applications, where multimedia content is distributed both on a SD channel (Standard Definition) and a HD channel (High Definition) the method and apparatus automatically selects always the highest quality for a respective content.

According to a further preferred embodiment metadata or a high bandwidth IP address may be checked for a respective standard bandwidth content or a detected channel identifier, wherein the requesting is stopped if no such metadata or HD IP address is available. Time consuming requests can, thus, be minimized.

According to a further embodiment the availability of a high bandwidth permission is checked in a subscriber account, wherein the permission request is stopped, if no such permission is available. On the other hand, if a permission is available, a permission controller submits a high bandwidth permission to the requesting terminal equipment and decrements a counter for counting a number of high bandwidth permissions predetermined for each subscriber account. This allows IPTV providers to set rules for individual subscriber accounts to limit the number of simultaneous high bandwidth multicast or unicast streams for a customer premise equipment. Moreover, it allows IPTV providers or operators to ensure quality of service (QoS) by limiting the required bandwidth to deliver subscriber requested services to less than the physical bandwidth the provider has allocated to the subscriber.

According to a further embodiment of the present invention the joining of the high bandwidth IP address may be directly performed, if a user confirmation is given to a requested bandwidth change. This further improves a user experience and reduces the time for a respective bandwidth change.

According to a further embodiment of the present invention the requesting constitutes a permission reservation for reservation a high bandwidth permission for a predetermined time. This allows for e.g. a digital video recorder (DVR) to reserve a high bandwidth permission in advance in order to realize programmed recording.

According to a further embodiment of the present invention the permission request may include a priority information related to a respective terminal equipment, wherein a high bandwidth permission is revoked from a terminal equipment having a first priority and enabled for a terminal equipment having a second priority, if the second priority is higher than the first priority. Thus, a user may set rules for the individual terminal equipment within the subscriber account for supporting HD access.

Finally, a high bandwidth permission may be revoked from a terminal equipment if it is in a sleep mode and/or a standard bandwidth mode for a predetermined time. This further improves the efficient bandwidth usage for a customer premise equipment having a plurality of terminal equipment, i.e. set top boxes.

The foregoing has outlined rather broadly the features and technical advantages of embodiments of the present invention in order that a detailed description of the invention that follows may be better understood. Additional features and advantages of embodiments of the invention will be described hereinafter, which form subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention and the advantages thereof, references are made to the following description taken in conjunction with the accompanying drawings, in which.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely dynamic bandwidth management in a home entertainment environment using HD (High Definition) and SD (Standard Definition) contents. The invention may also be applied, however, to other dynamic bandwidth management schemes where an efficient bandwidth usage is necessary in a customer premise equipment having a plurality of terminals related to a common subscriber account when delivering multimedia content over fixed or mobile access networks.

The present invention proposes a unique way to allow access to multiple network resources on a per-subscriber basis. Network operators may set software based rules that maintain a consistent end user experience without increasing the physical network layer bandwidth.

Figure 1:
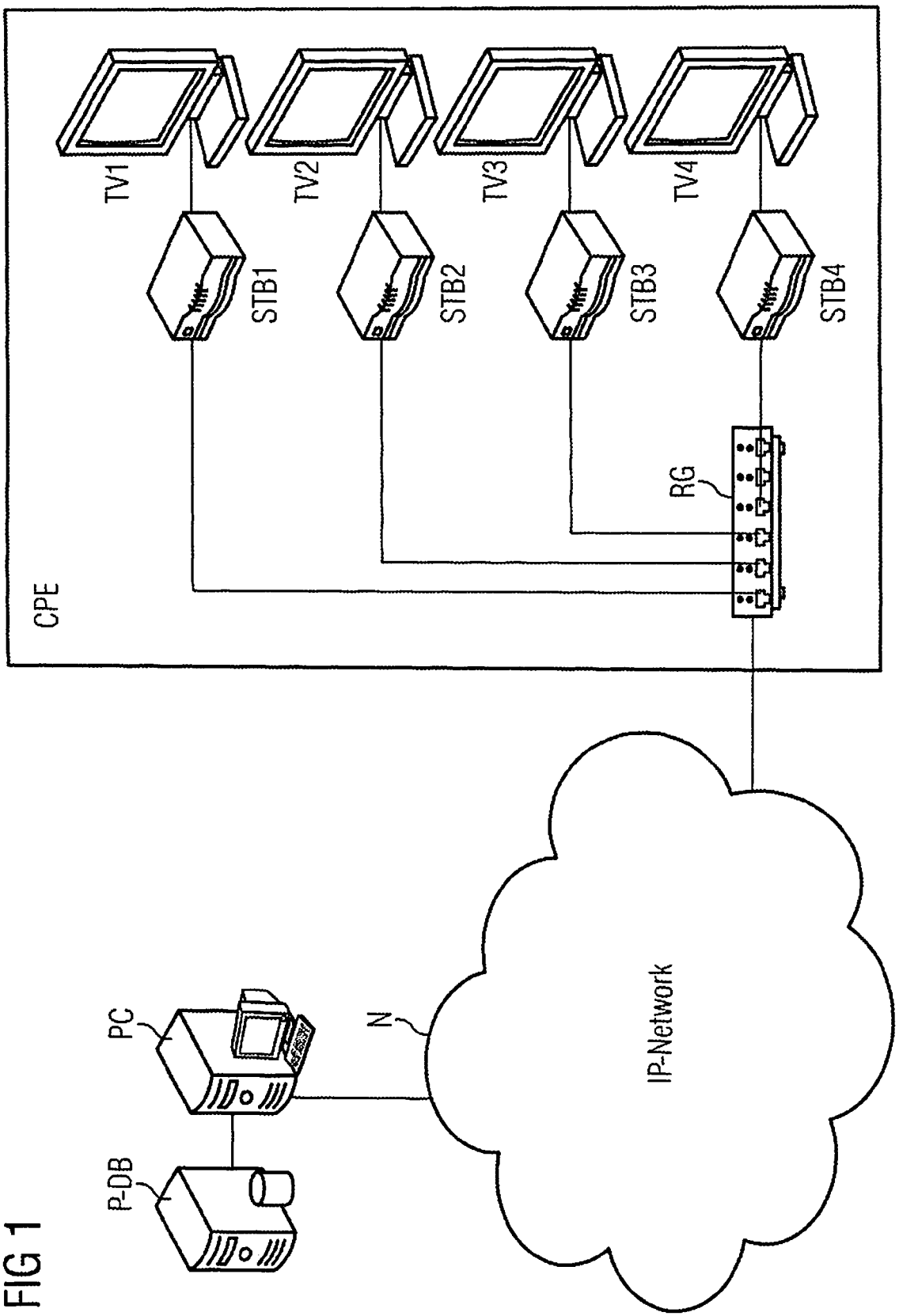
FIG. 1 illustrates a simplified block diagram of a dynamic bandwidth management scenario.

FIG. 1 illustrates a simplified block diagram of an IP-network scenario which enables a dynamic bandwidth management according to the present invention. According to FIG. 1 a customer premise equipment CPE may include a plurality of terminal equipment STB1 to STB4 which are connected to a respective output device TV1 to TV4. In FIG. 1 the terminal equipment is realized by so-called set top boxes STB1 to STB4 which are connected to respective television devices TV1 to TV4.

A customer premise equipment CPE, thus, includes a plurality of different terminals which might be available in a typical household. Moreover, a subscriber account defining relevant data for the household or subscriber (e.g. a maximum number of high bandwidth permissions (i.e. HD permissions) given to the household) is assigned to the customer premise equipment. These high bandwidth permissions may be stored beside further subscriber relevant data in a permission database P-DB which is linked to a permission controller PC being connected to a telecommunication network N. The network N may be the internet or any other IP network (e.g. packet switched network).

According to FIG. 1 the customer premise equipment CPE is connected to the IP-network N via a gateway node RG. The gateway node RG may constitute a modem or a residential gateway and connects the plurality of set top boxes STB1 to STB4 with the IP-network N. Even if the gateway node RG realizes typically a connection to a fixed access network it may also realize a connection to a mobile access network or to combinations thereof. Due to the limitation of the physical infrastructure in a network, e.g. a physical bandwidth between the gateway node RG of the customer premise equipment CPE and the IP-network N content providers (not shown) such as IPTV, service providers cannot guarantee the service when a plurality of set top boxes STB1 to STB4 attempts to access multiple high bandwidth resources simultaneously.

According to FIG. 1 the permission controller PC may define the number of high bandwidth (HBW) permissions available to each subscriber account (household) and dynamically assigns high bandwidth permissions to respective high bandwidth capable terminals, e.g. HD capable set top boxes STB1 to STB4. An operator may limit access to high bandwidth network resources on an individual subscriber basis. Moreover, this allows all HD-capable terminals STB1 to STB4 to dynamically share access to the available high bandwidth network resources based on a hierarchy configurable through the permission controller PC.

Figures 2, 3:
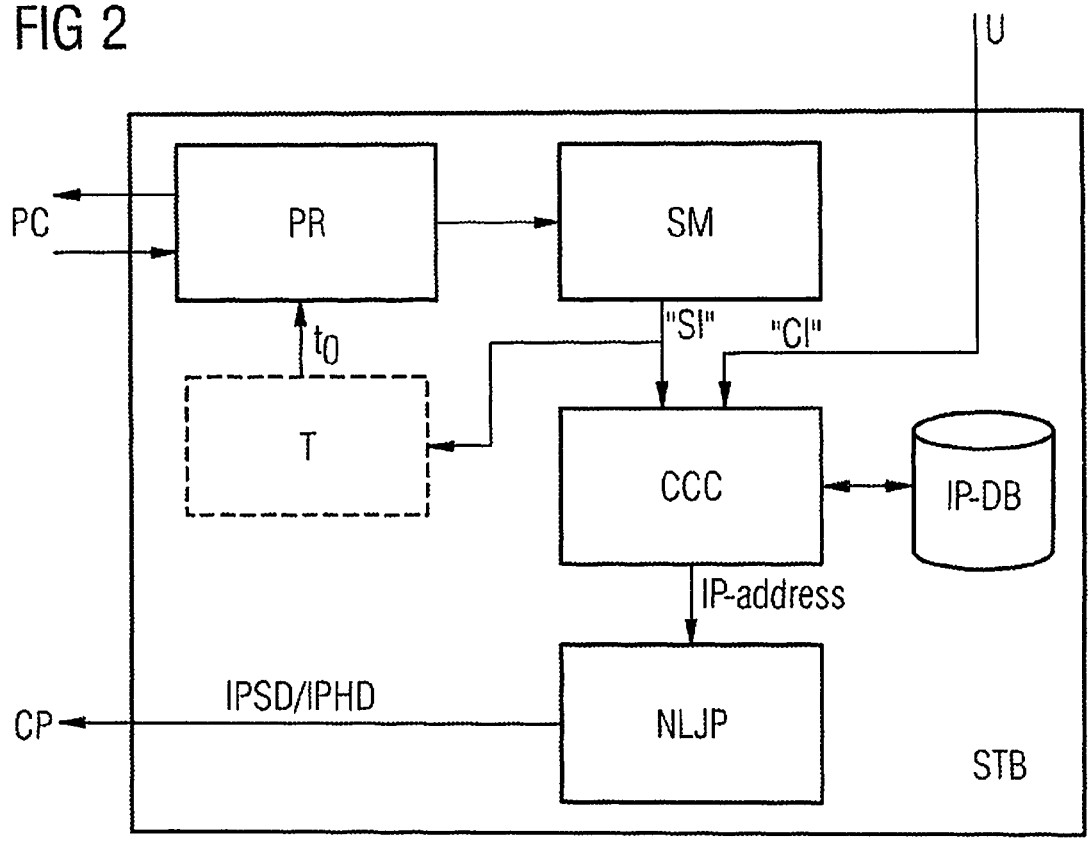
FIG. 2 illustrates a simplified block diagram of a terminal equipment shown in FIG. 1.
FIG. 3 illustrates a simplified table defining a mapping between a channel number and a physical IP address.

FIG. 2 illustrates a simplified block diagram of a set top box STB as shown in FIG. 2 including the relevant functional blocks to enable the dynamic bandwidth management.

According to FIG. 2 a state manager SM is provided to hold the current high bandwidth (HBW) permission of each individual set top box STB1 to STB4 and eventually included video recorders (DVR, not shown). The state manager SM interfaces with a channel change controller CCC. When the state manager SM shows an "HD allowed" state, e.g. a state information SI is set to "1", the channel change controller CCC joins the respective physical IP-address for a respective HD content via a network layer joining protocol NLJP. Otherwise, it joins the IP-address for the SD content. The network layer joining protocol NLJP may constitute a IGMPv2 or IGMPv3 routing protocol (Internet Group Management Protocol).

A set top box STB with "HD allowed" permission would include the IP multicast addresses containing HD streams while a set top box without the permission would only include the IP-addresses for SD content. According to the present invention an operator may determine a combination of HD multicast and VoD unicast streams a subscriber can concurrently join. This information may be stored in the permission-database P-DB as subscriber details. In detail, for operators using IGMPv2 routing protocol as network layer joining protocol NLJP a channel lineup contains both the SD IP addresses (IPSD) as well as the HD IP addresses (IPHD) for content items linked as a simulcast item. A set top box in the "HD allowed" state would join the HD IP address IPHD when defined in the channel lineup and the SD IP address IPSD for those that do not have a HD multicast defined.

FIG. 3 shows a respective mapping table which could be realized in a IP-database IP-DB as shown in FIG. 2. According to FIG. 3 each channel number, i.e. channel identifier, is mapped to a physical IP address of a content provider providing a HD content as well as a physical IP-address for an SD content. Thus, if the state identifier SI shows a "1", i.e. the set top box is in the "HD allowed" state the HD address of a respective channel is selected from the table and provided to the network layer joining protocol NLJP.

Moreover, operators may use IGMPv3 routing protocol as network layer joining protocol NLJP. In this case the state manager SM would define a source IP address of the content using the "multicast listen" command and the "filter mode" command "INCLUDE".

Referring back to FIG. 1 the permission controller PC and its related permission database P-DB hold information about the capabilities of the customer premise equipment CPE and the number of the high bandwidth streams available. The permission controller PC may receive requests from a permission requester PR (see FIG. 2) to access high bandwidth streams. If the permission controller PC includes available high bandwidth permission, it allocates a high bandwidth (HBW) permission to the requesting set top box STB. The permission controller PC may be configured to give priority to specific set top boxes and/or to revoke a high bandwidth permission from a lower priority device if requested by a higher priority device.

According to FIG. 2 the set top box may include further a timer T for generating a trigger signal to which is submitted to the permission requester PR, which initiates a permission request to the permission controller PC. Moreover, the channel change controller CCC may be controlled by a user U to receive e.g. a channel information CI containing a channel number or any other user confirmations.

Figure 4:
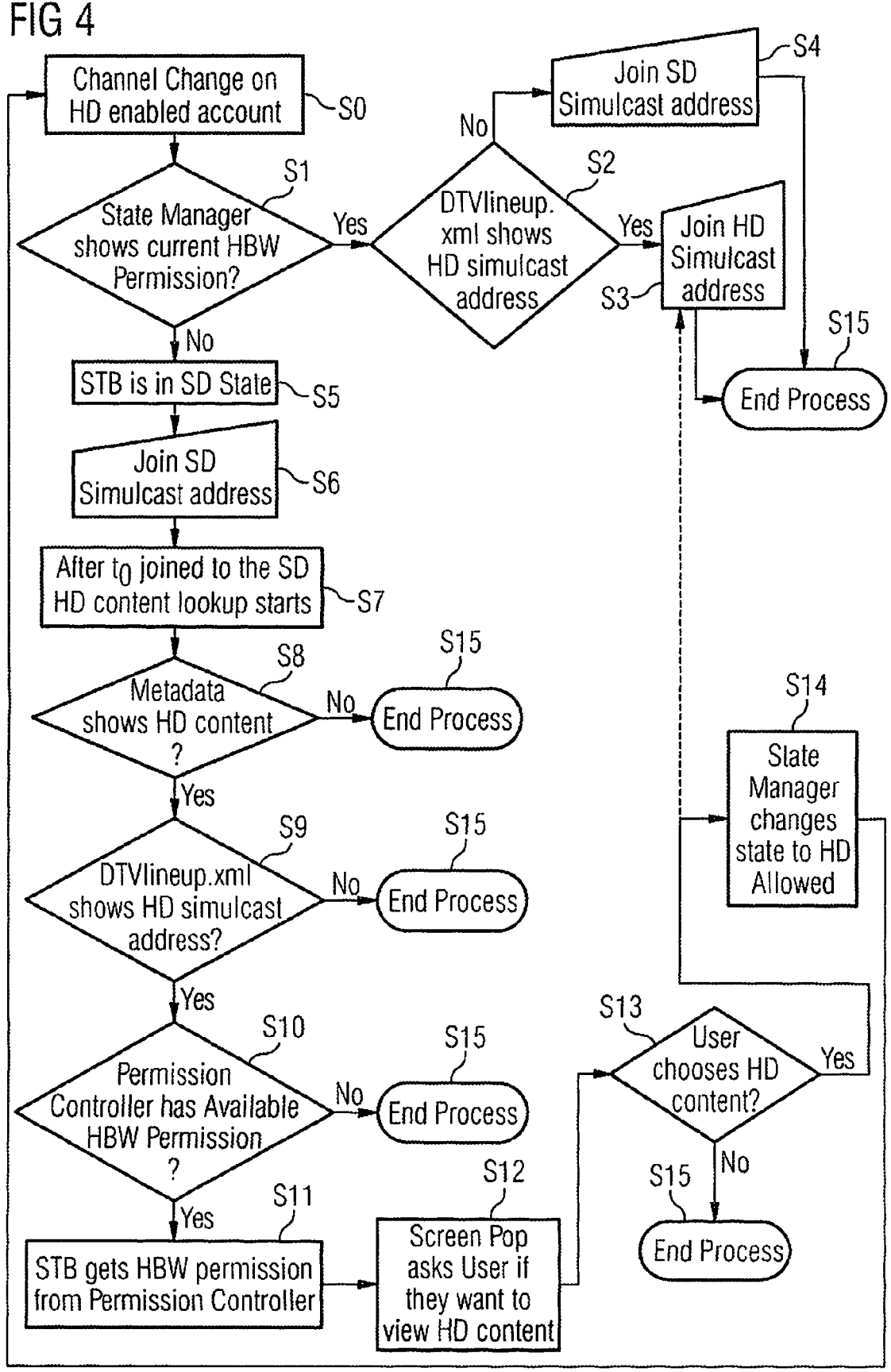
FIG. 4 illustrates a simplified flowchart of a method and a computer program product for dynamic bandwidth management in accordance with an embodiment of the present invention.

FIG. 4 illustrates a flowchart of a method and a computer program product according to an embodiment of the present invention. This flowchart will be described in the following in connection with the block diagram according to FIG. 2.

In a step S0 the channel change controller CCC may detect a channel identifier CI indicating a channel for a program content. In detail, in case a user U performs a channel change, this channel change would be detected and e.g. applied to an HD enabled account. In a step S1 the state manager SM checks a state identifier SI indicating a high bandwidth permission for a terminal equipment such as a set top box STB. In detail, step S1 determines whether the state manager SM of a set top box shows a current high bandwidth (HBW) permission or not.

In case a high bandwidth permission exists, i.e. state identifier SI="1", the channel change controller CCC may use the lookup table according to FIG. 3 being stored in the IP-database IP-DB to determine a physical high bandwidth IP address IPHD for the detected channel identifier CI. If no high bandwidth IP-address is available in the table of the IP-database IP-DB the physical IP-address of the content provider providing the standard definition (SD) content is used. According to step S3 said high bandwidth IP-address IPHD derived from the table for a respective channel number, i.e. channel identifier CI, is joined by the network layer joining protocol NLJP. In case no such high bandwidth IP-address IPHD is found in the table the flowchart branches to step S4 where the network layer joining protocol NLJP joins the SD simulcast address IPSD providing the respective content of the channel in a standard bandwidth. After the steps S3 and S4 the process ends in a step S15.

In case the state manager SM determines no high bandwidth permission in step S1 a high bandwidth permission is requested at the permission controller PC in order to realize a dynamic bandwidth management.

In detail, according to FIG. 4 the state manager may change in a step S5 the state identifier SI of the set top box STB into a SD state, i.e. indicating no high bandwidth permission. In a step S6 the channel change controller CCC instructs the network layer joining protocol to join the SD simulcast address IPSD given in the table of the IP-database IP-DB for each channel identifier, i.e. channel number.

In a step S7 an optional timer T may initiate the permission requester PR to request a high bandwidth permission a predetermined time to after the joining of the standard bandwidth IP-address IPSD realized in step S6.

In a step S8 the permission requester may check, whether metadata linked to the content delivered by the standard bandwidth IP-address refer also to a high bandwidth content, wherein the process is ended in a step S15, if no such metadata are available. Thus, the metadata of the standard definition content may be used to determine whether a corresponding high bandwidth content is available for a respective channel before initiating a request to the permission controller PC.

In a further step S9 the channel change controller may check whether a high bandwidth IP-address is available for said detected channel identifier CI by using the table according to FIG. 3 in the IP-database, wherein the process ends, if no such high bandwidth IP-address is available (see step S2).

Finally, in a step S10 the permission requester PR sends a request to the permission controller PC to check, whether a high bandwidth permission is available in a subscriber account including the requesting terminal equipment, i.e. the requesting set top box STB. Again, the process is ended in a step S15, if no such permission is available in the permission-database related to the permission controller PC, i.e. a permission does not exist or all permissions are already allocated.

In case the permission controller PC verifies that a high bandwidth permission is available for the requesting set top box the permission controller PC submits in a step S11 a high bandwidth permission to the requesting set top box STB and may decrement a counter for counting a number of high bandwidth permissions predetermined for each subscriber account. In detail, if a subscriber account has only two high bandwidth permissions these two high bandwidth permissions may be requested from the respective set top boxes STB1 to STB4, however, if they have been distributed in the household no further high bandwidth permissions may be given to this household, thus, ensuring that a physical bandwidth is not exceeded.

In an optional step S12 a screen pop may ask a user U if they want to view HD content or not. In case a user confirmation is given in a step S13 to choose the HD content the state manager SM changes in a step S14 to the "HD allowed" state, i.e. changes the state identifier SI from "0" to "1" and branches back to the step S0. In case no user confirmation is given in step S13 the process ends again in a step S15.

Furthermore, the channel change controller CCC may directly instruct (phantom line) the network layer joint protocol NLJP to join the HD simulcast address IPHD in a step S3 in case a user confirmation is given for the high bandwidth allowed state in step S13.

Thus, dynamic bandwidth management is realized for both multicast or unicast data streams. In particular, simulcast data streams as used in IPTV may be handled effectively.

According to a preferred embodiment of the present invention the requesting of the high bandwidth permission from the permission requester PR in step S10 may include a permission reservation for reserving a high bandwidth permission for a predetermined time. Thus, in case a set top box STB includes a digital video recorder (DVR) not shown, a high bandwidth permission for a program recording which may take place in the future may be reserved.

Moreover, the permission request issued by the permission requester PR to the permission controller PC in step S10 may include a priority information related to a requesting terminal equipment, i.e. set top box, wherein a high bandwidth permission is revoked from a set top box STB having a low priority and enabled for a set top box having a high priority.

In addition, a high bandwidth permission may be revoked from a set top box, if it is in a sleep mode and/or standard bandwidth mode, i.e. joining an SD IP-address IPSD, for a predetermined time. In detail, the timer T may watch the time duration in which the set top box is in these two modes and may issue a further (not shown) trigger signal to the permission requester PR to indicate a revocation of a high bandwidth permission to the permission controller PC. The permission controller receiving such an information may then increase the counter for counting the high bandwidth permissions for the respective subscriber account.

In the following the specific details are given to realize the present invention. In detail, the existing elements in the Myrio Middleware would require the following modification:

A HD flag has to be set by operators on high bandwidth streams/VOD (video on demand) assets, DTV (Digital Television) item details in TotalManage may need a HD flag, a SD and HD multicast field, a bit rate field for both multicast streams and a port for both streams, a "HD streams allowed" field may be needed in the subscriber details, the permission controller may have to be adapted to the method according to the present invention, "subscriber-info.xml" defining the subscriber information may need to have "HD streams allowed" info added, "Resource Proxy" may have to be integrated into the process, a DVR scheduler may have to reserve HD stream when HD recording is scheduled with permission controller, and a VoD menu browser may have to be integrated with permission controller for HD VoD content.

The present invention may be provided in an environment, where the HD data stream (HD CVBR) has 12 Mbps, the SD data stream (SD CVBR) has 3.75 Mbps and the VDSL average capacity is 23 Mbps. The bonded gateway node RG may have a bandwidth of 46 Mbps with 2 VDSL lines. The HD content may be revenue generating and the in-home network connectivity supports more than 50 Mbps. The IPTV installation of the customer premise equipment CPE includes four set top boxes STB1 to STB4, wherein at least one has a digital video recorder (DVR) or private video recorder (PVR).

According to the present invention a field may be added to the subscriber details in the permission-database P-DB allowing an operator to specify the number of HD streams a subscriber account can join simultaneously, i.e. high bandwidth permissions. A state identifier SI may be added to the channel change controller CCC, when the set top box has permission from the permission controller to view HD content. The state identifier-information should be known by the channel change controller. When an e.g. IGMP (Internet Group Management Protocol) leave-join to the next channel is requested, the channel change controller CCC may take the HD flagged multicast address from the mapping table (i.e. DTVline-up.xml file) stored in the IP-database IP-DB, if available.

When the state manager SM does not show that the set top box has the permission controller's permission to join an HD multicast address, the SD multicast address from the mapping table will be joined. For a seamless experience, the operator must be simulating content on both an HD and an SD multicast address. This seems to be the case for most current contents.

A field may be added to the DTV item description in "Total-Manage" that allows a SD multicast address to be associated with an HD multicast simulcast address. The mapping table is therefore changed to add the simulcast address for both an HD and an SD address for the same channel.

User configurable setup screens may have item added to let user set a predetermined set top box on the account as the "priority HD" set top box. When a user chooses this option and submits it to the permission controller, TotalManage should see if it has already allocated the priority HD resource to another set top box on the user account (using IP address or MAC. If so, a conflict message may warn the user that they are changing their primary HD set top box to the current set top box and that the other set top box will not automatically access HD content in the future.

A digital video recorder (DVR) scheduler could look at the "HD flag" when scheduling recording. If content is "HD flagged", a dialogue box could ask a subscriber if they want to record the HD version of the program. If the user confirms, the DVR schedules the recording for the HD multicast address and sends a reservation notice to the permission controller PC.

Moreover, an "HD" indicator could be incorporated into a screen overlay in a corner, on the info bar or the guide of the TV, or the set top box display, when the set top box is joined to an HD multicast IP address IPHD. The more it could be outlined or less prominent, when the set top box is enabled to join HD content but was viewing content on a channel that did not have an associated HD content source, while it is bold or more prominent, when the set top box is joined to an actual HD multicast source.

An operator may determine that a subscriber can access a combination of e.g. 2 (+/− depending on bandwidth) HD multicast or VoD (unicast) data streams concurrently and enters that number in the subscriber details field in TotalManage, i.e. permission-database P-DB. The permission controller may capture a number of HD streams allowed from a "subscriber.xml" document. If a primary HD set top box is assigned or chosen by the subscriber through the client user interface, the remaining available HD streams are allocated by the permission controller PC upon request. If a primary HD set top box is not selected which may be the recommended default setting for operators only supporting one HD stream at a time, all HD requests are handled by the permission controller PC.

A digital video recorder (DVR) may have top priority with the permission controller PC. VoD requests may have a second priority. Moreover, individual priorities may be given to set top boxes to define primary or secondary set top boxes. Those set top boxes that don't have the current state setting, indicating they have the permission controller's permission to join high bandwidth HD multicast addresses, leave/join only SD multicast addresses.

When a subscriber joins an SD channel an alternative subroutine could be used. In detail, the permission requester PR may check, if the selected channel has an HD multicast associated with it. In case there exists an HD multicast associate, a high bandwidth permission request is sent to the permission controller. In case the permission controller PC issues a high bandwidth permission for the respective requesting set top box a timer could generate a trigger signal which waits e.g. for 15 to 30 seconds and then pop a small dialogue box at the TV or set top box asking the subscriber if they would like to view the HD version of the program.

If a higher priority HD request goes to the permission controller PC, it should revoke the HD permission from the lower priority set top box, and automatically leaves the HD multicast and join the SD multicast for the session with a screen top explaining the channel change. When the set top box, that has been allocated an HD permission from the permission controller PC, is put into a sleep mode, or views SD content for longer than a predetermined time, e.g. 8 minutes, the permission controller can revoke the high bandwidth permission to have it available for the next set top box within the same subscriber account.

When browsing the HD flagged VoD content the set top box could check with the permission controller PC to see if there is an available high bandwidth permission, i.e. HD permission.

Moreover, it could check to see if an HD permission is in use by the digital video recorder or will be in use within a predetermined time, i.e. within 3 hours from now. If HD permission is available and no HD reservation is pending within 3 hours, the user should be able to browse HD flagged VoD content items. If not, a screen pop that lets the user know that all HD streams are currently in use should be displayed.

According to the present invention an operator may control bandwidths, while it gives subscribers or users a seamless experience. Moreover, channel numbers will be consistent on every set top box in the house, i.e. a specific TV-program is on a specific channel number regardless of whether the user is watching the HD or SD multicast feed. Moreover, there won't be any blank screen within a customer premise equipment which may result from a low efficient bandwidth.

Thus, the present invention allows e.g. IPTV providers to ensure quality of service by limiting the required bandwidth to deliver subscriber requested services at any time to less than the physical bandwidth the provider has allocated to the subscriber, while at the same time making sure that all customer premise equipment can take advantage of the maximum physical bandwidths to the home dynamically sharing band-widths in the context of a hierarchical access protocol.

Moreover, the dynamic in-home bandwidth management scheme allows IPTV providers to set rules for individual subscriber accounts to limit the number of simultaneous high bandwidth multicast or unicast data streams. This allows operators to set software based rules that maintain a consistent end user experience rather than setting parameters at the physical network layer to limit bandwidth to the home which may prevent a user from accessing a desired resource without providing that user an explanation of the reason, why the access is denied.

Thus, according to the present invention a standard definition (SD) and a high definition (HD) network resource is combined in a single channel definition referred to as simulcast for e.g. IGMPv2 and using the "MulticastListen" command and the "Filter Mode" command "INCLUDE" for IGMPv3 as network layer joining protocols. Furthermore, an operator has the ability to limit access to high bandwidth network resources on an individual subscriber basis. The present invention allows all capable terminals of a customer premise equipment to dynamically share access to the available high bandwidth network resources based on a hierarchy, which is configurable through a permission controller. Finally, the present invention allows a channel numbering by content, but not IP stream, which means the end user experience is consistent on SD only accounts and SD/HD accounts.

FIG. 4 illustrates a flowchart of a method and computer program product according to the present invention. It will be understood that each block or step of the flowchart and combinations of blocks in the flowchart, can be implemented by computer program instructions. These computer program instructions may be loaded onto a computer or another programmable apparatus to produce a machine, such that the instructions which are executed on the computer or other programmable apparatus create means for implementing the functions specified in the blocks or steps of the flowchart. These computer program instructions may also be stored in a computer readable memory, e.g. DVD, CD, diskette etc., that can direct a computer or other programmable apparatus to function in a particular manner. Moreover, these computer program instructions may be downloaded in e.g. a telecommunications network to cause operational steps to be performed on the computer or other programmable apparatus to produce a computer implemented process such that the instructions which execute on the computer or other programmable apparatus provide steps for implementing the functions specified in the blocks or steps of the flowchart.

Accordingly, blocks or steps of the flowchart support combinations of means for performing the specified functions, combinations of steps for performing the specified functions and program instruction means for performing the specified functions. It will also be understood that each block or step of the flowchart, and combinations of blocks or steps in the flowchart can be implemented by special purpose hardware based computer systems which perform the specified functions or steps or combinations of the special purpose hardware and computer instructions.

Although embodiments of the present invention and their advantages have been described in detail, it should be understood that various changes, substitutions and alterations can be made therein without departing from the spirit and scope of the invention as defined by the appended claims. For example, it will be readily understood by those skilled in the art that many of the features, functions, processes and methods described herein may be varied while remaining within the scope of the present invention. Moreover, the scope of the present application is not intended to be limited to the particular embodiments of the system, process, method or steps presently existing or to be developed later, that perform substantially the same function or achieve substantially the same result as the corresponding embodiments described herein may be utilized according to the present invention. Accordingly, the appended claims are intended to include within their scope such systems, processes, methods or steps.

What is claimed is:

1. A method comprising:
   via a channel change controller:
   detecting a channel identifier indicating a channel for a program content;
   responsive to an indication of a high bandwidth permission, said high bandwidth permission indicated in a state identifier, said high bandwidth permission assigned for a terminal equipment by a permission controller, determining a high bandwidth IP address for said detected channel identifier, said high bandwidth IP address joined via a network layer joining protocol and adapted to receive a high bandwidth content of said channel via said network layer joining protocol;
   responsive to no indication of said high bandwidth permission, via a permission requester, requesting said high bandwidth permission from said permission controller; and
   joining a standard bandwidth IP address to receive standard bandwidth content of said channel wherein said requesting is started a predetermined time after said joining.

2. The method of claim 1, wherein:
said requesting is started after a predetermined time.

3. The method of claim 1, further comprising:
checking metadata linked to said standard bandwidth content;
responsive to an indication that said metadata does not refer to high bandwidth content, stopping said requesting.

4. The method of claim 1, further comprising:
checking whether said high bandwidth IP address is available for said detected channel identifier;
responsive to an indication that no high bandwidth IP address is available, stopping said requesting.

5. The method of claim 1, further comprising:
checking whether said high bandwidth permission is available in a subscriber account including said terminal equipment;
responsive to an indication that said high bandwidth permission is not available, stopping said requesting.

6. The method of claim 1, wherein:
responsive to a request for high bandwidth permission from said terminal equipment, said permission controller decrements a counter, said counter counting a number of high bandwidth permissions predetermined for each subscriber account.

7. The method of claim 1, further comprising:
responsive to a request for high bandwidth permission from said terminal equipment, performing a user confirmation, wherein, responsive to said user confirmation, said state identifier is changed to a high bandwidth allowed state.

8. The method of claim 1, wherein:
responsive to a user confirmation, said joining of said high bandwidth IP address is directly performed.

9. The method of claim 1, wherein:
responsive to a change in said state identifier to a high bandwidth allowed state, proceeding to said detecting.

10. The method of claim 1, wherein:
said program content is provided by multicast data streams.

11. The method of claim 1, wherein:
said program content is provided by unicast data streams.

12. The method of claim 1, wherein:
said requesting constitutes a permission reservation for reservation of a high bandwidth permission for a predetermined time.

13. The method of claim 1, wherein:
said requesting includes priority information related to said terminal equipment, wherein, responsive to a determination that a second priority is higher than a first priority, said permission controller is adapted to revoke a first high bandwidth permission from a first terminal equipment with a first priority and enable a second high bandwidth permission for a second terminal equipment with a second priority.

14. The method of claim 1, wherein:
responsive to an indication that said terminal equipment is in sleep mode, said high bandwidth permission is revoked.

15. The method of claim 1, wherein:
responsive to an indication that said terminal equipment has been in standard bandwidth mode for a predetermined time, said high bandwidth permission is revoked.

16. A computer program product comprising a non-transitory computer-readable medium storing computer readable program portions adapted for causing a processor to execute the method steps according to claim 1.

17. An apparatus comprising:
a channel change controller adapted to detect a channel identifier indicating a channel for a program content;
a state manager adapted to check a state identifier indicating a high bandwidth permission assigned for a terminal equipment by a permission controller;
a permission requester adapted to make a permission request for said high bandwidth permission from said permission controller;
an IP-database adapted to map a plurality of available high and standard bandwidth IP addresses with said channel identifier;

a network layer joining protocol adapted for joining an IP address, wherein responsive to an indication of said high bandwidth permission, said channel change controller determines a high bandwidth IP address for said detected channel identifier and said network layer joining protocol joins to said determined high bandwidth IP address, and responsive to an indication of no high bandwidth permission, said permission requester requests said high bandwidth permission from said permission controller; and a timer adapted to generate a trigger signal for initiating a request of said permission requester after said network layer joining protocol joins a standard bandwidth IP address for a predetermined time.

18. The apparatus of claim 17, wherein
said network layer joining protocol joins a standard bandwidth IP address to receive a standard bandwidth content of said channel.

19. The apparatus of claim 17, wherein:
said network layer joining protocol joins a standard bandwidth IP address to receive a standard bandwidth content of said channel;
responsive to an indication that metadata delivered by said standard bandwidth IP address do not refer to high bandwidth content, said permission requester does not make said permission request.

20. The apparatus of claim 17, wherein:
said permission requester checks whether said high bandwidth IP address is available for said detected channel identifier;
responsive to an indication that said high bandwidth IP address is not available, said permission requester does not make said permission request.

21. The apparatus of claim 17, wherein:
said permission requester checks whether said high bandwidth permission is available in a subscriber account including said terminal equipment;
responsive to an indication that said high bandwidth permission is not available, said permission requester does not make said permission request.

22. The apparatus of claim 17, wherein:
responsive to a receipt of said high bandwidth permission for said terminal equipment, said permission requester asks for a user confirmation, and wherein, responsive to said user confirmation, said state manager changes said state identifier to a high bandwidth allowed state.

23. The apparatus of claim 17, wherein:
responsive to a user confirmation said network layer joining protocol joins said high bandwidth IP address directly.

24. The apparatus of claim 17, wherein:
said program content is provided by multicast data streams.

25. The apparatus of claim 17, wherein:
said program content is provided by unicast data streams.

26. The apparatus of claim 17, wherein:
said permission requester performs a permission reservation for reservation of a high bandwidth permission for a predetermined time.

27. The apparatus of claim 17, wherein
said permission request comprises priority information related to said terminal equipment, wherein, responsive to a determination that a second priority is higher than a first priority, and wherein said permission controller is adapted to revoke a first high bandwidth permission from a first terminal equipment with a first priority and enable a second high bandwidth permission for a second terminal equipment with a second priority.

28. The apparatus of claim 17, wherein:
responsive to an indication that said terminal equipment is in sleep mode, said high bandwidth permission is revoked.

29. The apparatus of claim 17, wherein:
responsive to an indication that said terminal equipment has been in standard bandwidth mode for a predetermined time, said high bandwidth permission is revoked.

30. The apparatus of claim 17, wherein:
said apparatus is a set top box.

* * * * *